United States Patent
Liu et al.

(10) Patent No.: US 10,513,004 B2
(45) Date of Patent: Dec. 24, 2019

(54) WHEEL CORNER POLISHING DEVICE

(71) Applicant: CITIC Dicastal CO., LTD., Qinhuangdao, Hebei (CN)

(72) Inventors: Huiying Liu, Qinhuangdao (CN); Lijie Hu, Qinhuangdao (CN); Xiaopeng Chen, Qinhuangdao (CN); Zenglei He, Qinhuangdao (CN); Yongwang Zhao, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 149 days.

(21) Appl. No.: 15/801,427

(22) Filed: Nov. 2, 2017

(65) Prior Publication Data

US 2019/0061089 A1 Feb. 28, 2019

(30) Foreign Application Priority Data

Aug. 30, 2017 (CN) .......................... 2017 1 0763269

(51) Int. Cl.
| | | |
|---|---|---|
| *B24B 5/12* | (2006.01) | |
| *B24B 5/44* | (2006.01) | |
| *B24B 9/04* | (2006.01) | |
| *B24B 27/00* | (2006.01) | |
| *B24B 41/00* | (2006.01) | |
| *B24B 49/12* | (2006.01) | |

(52) U.S. Cl.
CPC .................. *B24B 5/12* (2013.01); *B24B 5/44* (2013.01); *B24B 9/04* (2013.01); *B24B 27/0023* (2013.01); *B24B 27/0069* (2013.01); *B24B 27/0076* (2013.01); *B24B 41/005* (2013.01); *B24B 49/12* (2013.01)

(58) Field of Classification Search
CPC .... B24B 5/12; B24B 5/35; B24B 5/44; B24B 9/02; B24B 9/04; B24B 19/00; B24B 21/02; B24B 21/12; B24B 21/16; B24B 27/0023; B24B 27/0069; B24B 27/0076; B24B 41/005; B24B 41/067; B24B 49/12
USPC ........................................... 451/65
See application file for complete search history.

(56) References Cited

U.S. PATENT DOCUMENTS

| | | | | |
|---|---|---|---|---|
| 3,258,804 A | * | 7/1966 | Fowle ..................... | B24B 5/225 |
| | | | | 15/104.011 |
| 4,216,560 A | * | 8/1980 | Schmidt .................. | B24B 41/06 |
| | | | | 15/268 |

(Continued)

FOREIGN PATENT DOCUMENTS

| | | |
|---|---|---|
| CN | 203600007 U | 5/2014 |
| CN | 103072057 B | 5/2015 |

(Continued)

OTHER PUBLICATIONS

Supplementary European Search Report in the European application No. 18190684.3, dated Jan. 24, 2019, 26 pgs.

*Primary Examiner* — Eileen P Morgan
(74) *Attorney, Agent, or Firm* — Cooper Legal Group, LLC

(57) ABSTRACT

A wheel corner polishing device includes a station switching system, a valve hole polishing system, a bolt hole polishing system and a rim and cap section synchronous polishing system. The wheel corner polishing device can automatically polish four positions including bolt hole corners, a valve hole corner, outer rim corners and cap section corners of a wheel via upper and lower stations and coordination of the systems.

1 Claim, 5 Drawing Sheets

(56) References Cited

U.S. PATENT DOCUMENTS

| | | | | |
|---|---|---|---|---|
| 5,134,807 A | * | 8/1992 | Keefe | B24B 7/16 |
| | | | | 451/259 |
| 5,161,281 A | * | 11/1992 | Hanen | B08B 1/04 |
| | | | | 15/88.3 |
| 5,762,542 A | * | 6/1998 | Sandvold | B24B 9/002 |
| | | | | 451/188 |
| 2007/0037497 A1 | * | 2/2007 | Tanaka | B24B 5/44 |
| | | | | 451/312 |
| 2007/0042678 A1 | * | 2/2007 | Tanaka | B24B 5/44 |
| | | | | 451/5 |
| 2013/0102233 A1 | * | 4/2013 | Cheon | B24B 27/033 |
| | | | | 451/331 |
| 2017/0182615 A1 | | 6/2017 | Xue et al. | |

FOREIGN PATENT DOCUMENTS

| | | | | |
|---|---|---|---|---|
| GB | 667407 A | * | 2/1952 | B24B 5/44 |
| JP | 3044289 B2 | * | 5/2000 | |
| JP | 3091417 B2 | * | 9/2000 | |
| KR | 20160047284 A | | 5/2016 | |

* cited by examiner

WHEEL CORNER POLISHING DEVICE

CROSS-REFERENCE TO RELATED APPLICATIONS

The present application claims benefit of Chinese Patent Application No. 201710763269.9, filed on Aug. 30, 2017, the contents of which are hereby incorporated by reference in its entirety.

BACKGROUND

In production of aluminum alloy wheels, corrosion failure takes a great proportion. It is discovered by customer feedback that corrosion is mostly concentrated at four parts, which are respectively bolt hole countersink corners, a valve hole countersink corner, outer rim corners and cap section corners. The biggest reasons of corrosion are too small corner fillets and insufficient film coverage. In actual production, if the corners are polished manually, not only is the efficiency low, but also all corner positions cannot be guaranteed to be smooth.

SUMMARY

The disclosure relates to the technical field of wheel corner polishing, specifically to a device for automatically polishing four positions including bolt hole corners, a valve hole corner, outer rim corners and cap section corners of a wheel.

The disclosure is aimed at providing a wheel corner polishing device, which can meet the requirement of an automatic production line for automatically polishing four positions including bolt hole corners, a valve hole corner, outer rim corners and cap section corners of a wheel.

A wheel corner polishing device is composed of a rack, a first jacking cylinder, first guide posts, a first lifting table, a first guide rail, a first adjusting cylinder, a first sliding table, a first polishing motor, an outer rim polishing head, a second jacking cylinder, second guide posts, a second lifting table, a second guide rail, a second adjusting cylinder, a second sliding table, a second polishing motor, a cap section polishing head, a station switching motor, a coupling, a bearing seat, a bearing, a station switching table, positioning guide rails, a fifth sliding table, a sixth sliding table, a gear rack, a clamping cylinder, drive motors, clamping wheels, a polishing roller bed, a wheel feeding roller bed, a wheel discharge roller bed, a pitch adjusting guide rail, a pitch adjusting sliding table, a pitch adjusting cylinder, a third guide rail, a third adjusting cylinder, a third sliding table, a connecting rod, a turning plate, a feeding guide rail, a feeding sliding table, a feeding cylinder, a third polishing motor, a valve hole polishing head, a vision sensor, a servo motor, a shaft, a rotating table, an electric cylinder, a support frame, guide posts, a feeding platform, a fourth guide rail, a fourth sliding table, a fourth adjusting cylinder, a fourth polishing motor and a bolt hole polishing head.

The wheel corner polishing device includes a station switching system, in which the station switching motor is fixed on the rack, the output end of the station switching motor is connected with the station switching table via the coupling, and the polishing roller bed and four positioning guide rails are mounted on the upper surface of the station switching table. The fifth sliding table and the sixth sliding table are symmetrically mounted on the positioning guide rails, and are connected via the gear rack. The clamping cylinder is fixed on the station switching table, and the output end of the clamping cylinder is connected with the fifth sliding table. Two drive motors are respectively mounted on the fifth sliding table and the sixth sliding table, and the clamping wheels are mounted at the output ends of the drive motors. When a wheel enters the polishing roller bed from the wheel feeding roller bed, the clamping cylinder is started, the fifth sliding table and the sixth sliding table move synchronously under the action of the gear rack, and the wheel can be positioned and clamped via the clamping wheels. In an upper station, the wheel is positioned and clamped on the upper surface of the station switching table, and then corners of bolt holes and a valve hole are polished. The structure of the lower surface of the station switching table is symmetric to and completely consistent with that of the upper surface; and in a lower station, the wheel is positioned and clamped on the lower surface of the station switching table, and then corners of the outer rim and cap sections are polished. The station switching motor can control rotation of the station switching table, thus controlling cyclic switching of the upper station and the lower station; after corner polishing of the bolt holes and valve hole of the wheel are completed at the upper station, it is switched to the lower station for corner polishing of the outer rim and cap sections; and after the polishing is completed, the wheel is rotated to the upper station again for transferring down. Corner polishing of the bolt holes and valve hole of the wheel is completed at the upper station, corner polishing of the outer rim and cap sections is completed at the lower station, corner polishing of four positions is completed via switching and coordination of the upper and lower stations.

The wheel corner polishing device includes a valve hole polishing system, in which the pitch adjusting cylinder and the pitch adjusting guide rail are fixed on the rack, the pitch adjusting sliding table is mounted on the pitch adjusting guide rail, and the output end of the pitch adjusting cylinder is connected with the pitch adjusting sliding table to control horizontal movement of the sliding table. The third adjusting cylinder and the third guide rail are fixed on the pitch adjusting sliding table, the third sliding table is mounted on the third guide rail, and the output end of the third adjusting cylinder is connected with the third sliding table to control horizontal movement of the third sliding table. The turning plate is articulated with the pitch adjusting sliding table, one end of the connecting rod is articulated with the third sliding table, the other end of the connecting rod is articulated with the turning plate, and when the third adjusting cylinder drives the third sliding table to move horizontally, the turning angle of the turning plate can be adjusted. The feeding cylinder and the feeding guide rail are fixedly mounted on the turning plate, the feeding sliding table is mounted on the feeding guide rail, the output end of the feeding cylinder is connected with the feeding sliding table, the third polishing motor is fixed on the feeding sliding table, and the valve hole polishing head is mounted at the output end of the third polishing motor. The vision sensor is mounted at the bottom of the turning plate and used for recognizing the position of the valve hole, after the wheel is positioned and clamped at the upper station, the drive motors are started, the wheel rotates at a low speed, the valve hole rotating below the vision sensor is recognized, at the moment, the wheel stops rotating, and the valve hole is ready for corner polishing. The horizontal position of the valve hole polishing head can be adjusted via the pitch adjusting cylinder, the angle between the valve hole polishing head and the central axis of the wheel can be adjusted via the third adjusting cylinder, the rotating polishing head can be fed for polishing in the direction of the valve hole via the feeding cylinder. The polishing head of this system can be correspondingly adjusted according to the radial position and angle of the valve hole, and can thus be used for corner polishing of different wheel outer diameters and different valve hole angles with wider adaptability.

The wheel corner polishing device includes a bolt hole polishing system, in which the servo motor is fixedly mounted at the top of the rack, and the output end of the servo motor is connected with the rotating table via the shaft to control rotation of the rotating table. The support frame is fixed on the rotating table, the electric cylinder is fixed on the support frame, and the output end of the electric cylinder is connected with the feeding platform to control up-down motion of the feeding platform under the guiding effect of the guide posts. The fourth guide rail and the fourth adjusting cylinder are fixed on the feeding platform, the fourth sliding table is mounted on the fourth guide rail, and the output end of the fourth adjusting cylinder is connected with the fourth sliding table to control horizontal motion thereof. The fourth polishing motor is mounted on the fourth sliding table, and the bolt hole polishing head is mounted at the output end of the fourth polishing motor. After the valve hole of the wheel is recognized by the vision sensor, the wheel stops rotating, the first polished bolt hole is determined according to the included angle between the valve hole and the bolt hole, at the moment, the servo motor is started to drive the rotating table to rotate, the bolt hole polishing head is thus driven to rotate around the center of the wheel, the bolt hole polishing head rotates to a position above the first bolt hole that needs to be polished, and then the electric cylinder is started to drive the rotating bolt hole polishing head to be fed down to polish the corner. After the corner of the first bolt hole is polished, the electric cylinder drives the bolt hole polishing head to move up and reset, then the servo motor continuously drives the bolt hole polishing head to rotate around the center of the wheel, the bolt hole polishing head rotates to a position above the second bolt hole according to the included angle between the bolt holes, the polishing begins, all bolt holes are polished in sequence. The horizontal position of the polishing head can be adjusted via the fourth adjusting cylinder, thus, this system can polish wheel bolt holes having different pitch diameters, the servo motor can drive the polishing head to rotate 360 degrees around the center of the wheel, thus, this system can be used for polishing wheels having different numbers of bolt holes.

The wheel corner polishing device includes a rim and cap section synchronous polishing system, in which the first jacking cylinder is fixed on a cross beam at the bottom of the rack, and the output end of the first jacking cylinder is connected with the first lifting table to control ascending and descending of the first lifting table under the guiding effect of the four first guide posts. The first adjusting cylinder and the first guide rail are fixed on the first lifting table, the first sliding table is mounted on the first guide rail, the output end of the first adjusting cylinder is connected with the first sliding table to control horizontal motion thereof, the first polishing motor is mounted on the first sliding table, the outer rim polishing head is mounted at the output end of the first polishing motor, and feeding of the outer rim polishing head can be controlled via the first jacking cylinder. The second jacking cylinder is fixed on the cross beam at the bottom of the rack, and the output end of the second jacking cylinder is connected with the second lifting table to control ascending and descending of the second lifting table under the guiding effect of the four second guide posts. The second adjusting cylinder and the second guide rail are fixed on the second lifting table, the second sliding table is mounted on the second guide rail, the output end of the second adjusting cylinder is connected with the second sliding table to control horizontal motion thereof, the second polishing motor is mounted on the second sliding table, the cap section polishing head is mounted at the output end of the second polishing motor, and feeding of the cap section polishing head can be controlled via the second jacking cylinder. After the valve hole and bolt holes of the wheel are polished at the upper station, the wheel is switched to the lower station via the station switching system, at the moment, the wheel begins rotating at a low speed under drive of the drive motors, the first jacking cylinder drives the outer rim polishing head to be fed to polish the outer rim of the wheel, and the second jacking cylinder drives the cap section polishing head to be fed to polish the cap sections of the wheel. From the beginning of polishing to one-circle rotation of the wheel, the whole outer rim and the cap sections are completely polished. The horizontal position of the outer rim polishing head can be adjusted via the first adjusting cylinder, and the horizontal position of the cap section polishing head can be adjusted via the second adjusting cylinder, so this system can polish wheels having different outer diameters and different cap section sizes.

The working process of the device is: first, according to the outer diameter, cap section size, valve hole angle and bolt hole pitch diameter of a wheel produced on line, the initial positions of the outer rim polishing head, the cap section polishing head, the valve hole polishing head and the bolt hole polishing head are adjusted. When the wheel enters the polishing roller bed from the wheel feeding roller bed, the clamping cylinder is started, and the wheel is positioned and clamped; next, the drive motors are started to drive the wheel to rotate at a low speed, and when the vision sensor recognizes the position of the valve hole, the wheel stops rotating; then, the valve hole polishing head is fed to polish the corner of the valve hole, the bolt hole polishing head rotates to a position above the first bolt hole and polishes the corner of the bolt hole, after the first bolt hole is polished, the servo motor drives the rotating table to rotate, the bolt hole polishing head rotates to a position above the second bolt hole, and the corners of the bolt holes are polished in sequence, till all the bolt holes are polished; next, the station switching motor is started, the wheel at the upper station rotates to the lower station and continuously undergoes corner polishing of the outer rim and cap sections, and the positioning device idle at the lower station rotates to the upper station for positioning and polishing of next wheel. At the moment, the device is in a full-load state, the corners of the valve hole and bolt holes of the wheel are polished at the upper station, the corners of the outer rim and cap sections are polished at the lower station, and all the corner polishing time is effectively shortened via reasonable design of the upper and lower stations, so the cycle is short and the efficiency is high. When both the upper and lower stations complete polishing, the station switching motor is restarted to switch the wheel at the upper or lower station, at the moment, corner polishing at four positions has been completed for the wheel at the upper station, the wheel is loosened and fed into the wheel discharge roller bed, the upper station continuously receives next wheel to be polished, and so on.

The disclosure can meet the requirement of an automatic production line, and can automatically polish four positions including bolt hole corners, a valve hole corner, outer rim corners and cap section corners of a wheel via reasonable process layout, upper and lower stations and coordination of the systems, so that the minimum fillets of the four positions meet the requirements. The device has the characteristics of short cycle, high efficiency, skilful design, strong generality, easy manufacture and the like.

LIST OF REFERENCE SYMBOLS

Figure 1:
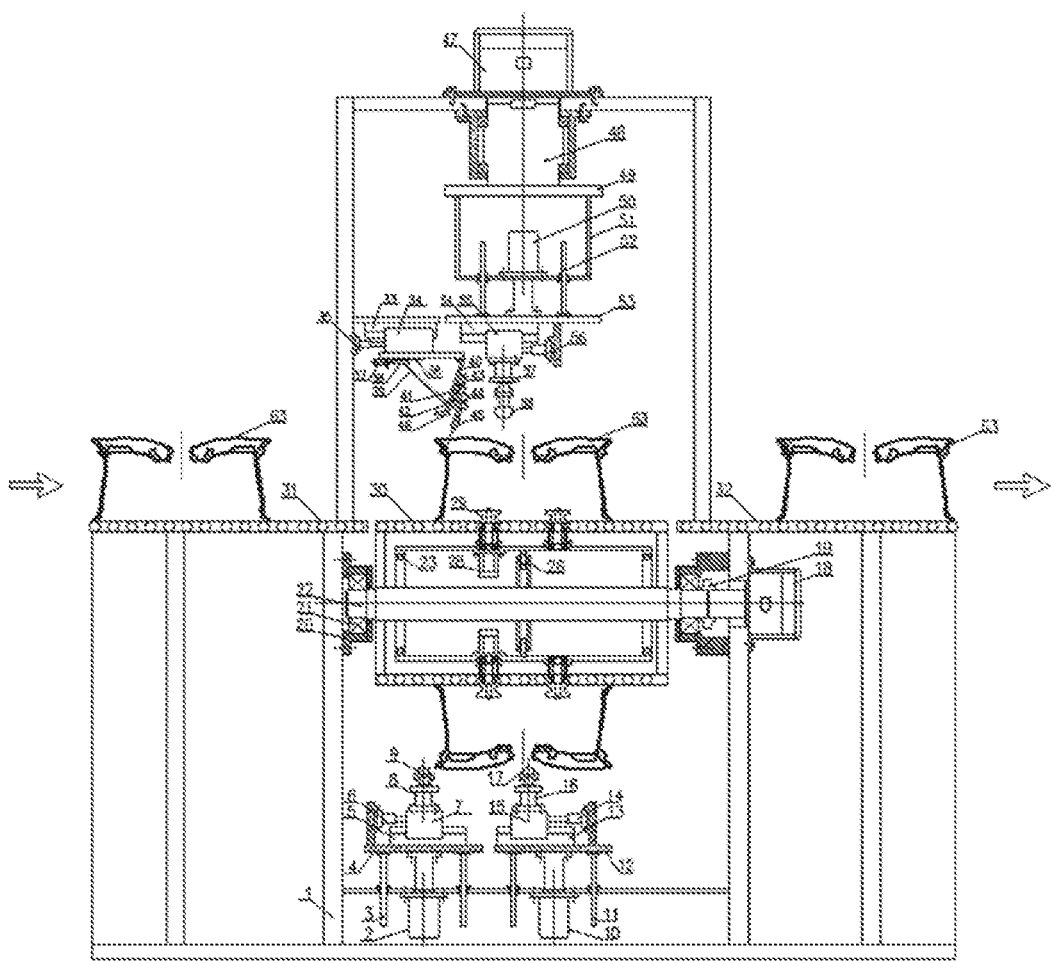
FIG. 1 is a front view of a wheel corner polishing device of the disclosure.
Figure 2:
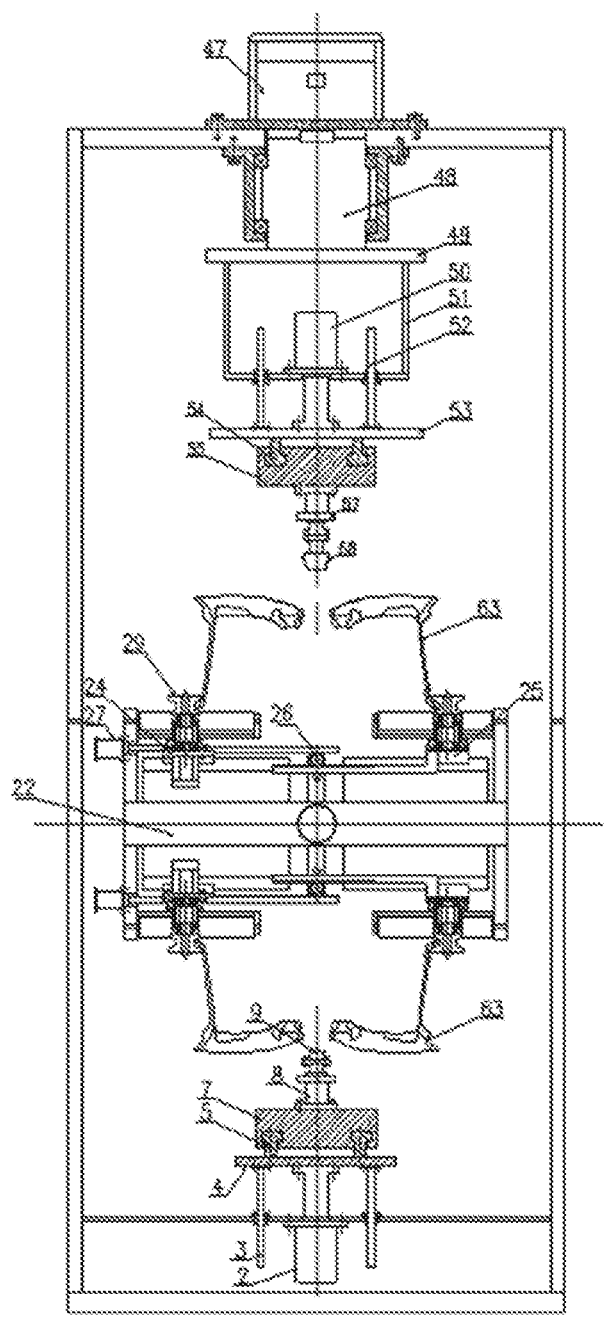
FIG. 2 is a left view of the wheel corner polishing device of the disclosure.
Figure 3:
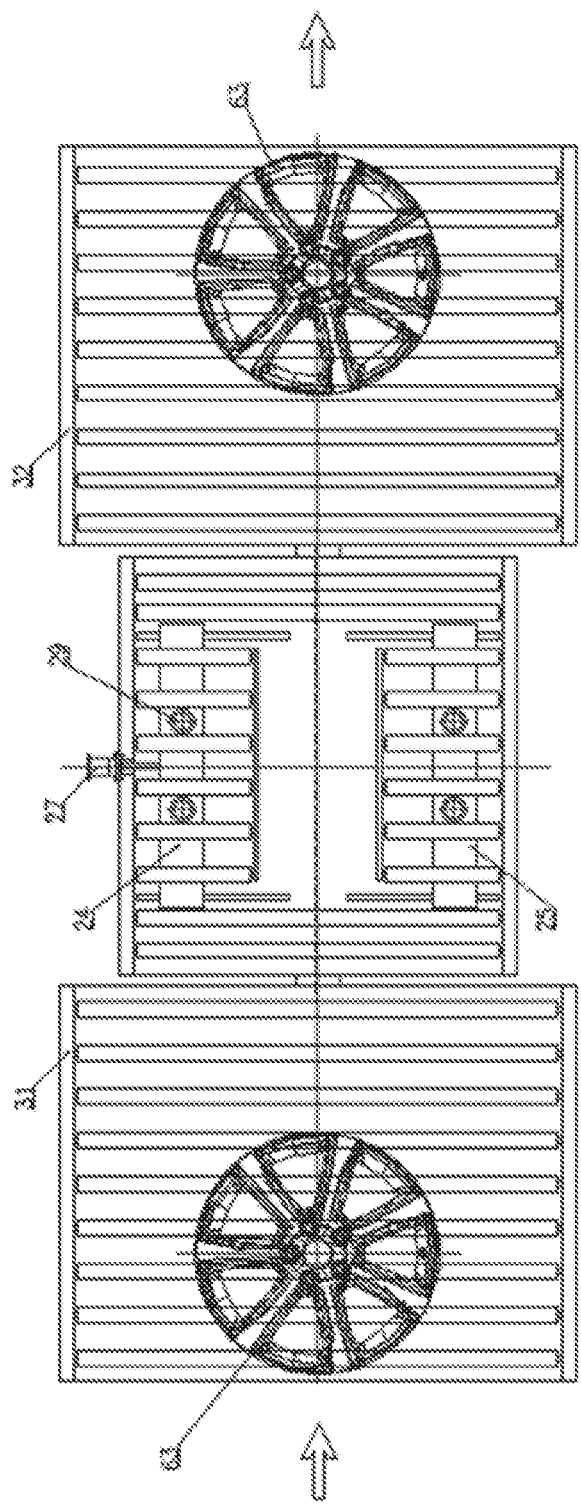
FIG. 3 is a top view of the wheel corner polishing device of the disclosure.
Figure 4:
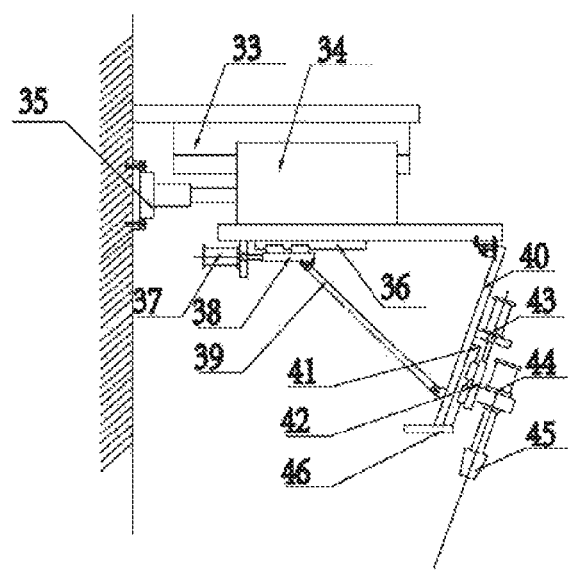
FIG. 4 is a partial enlarged view of a valve hole polishing system of the wheel corner polishing device of the disclosure.
Figure 5:
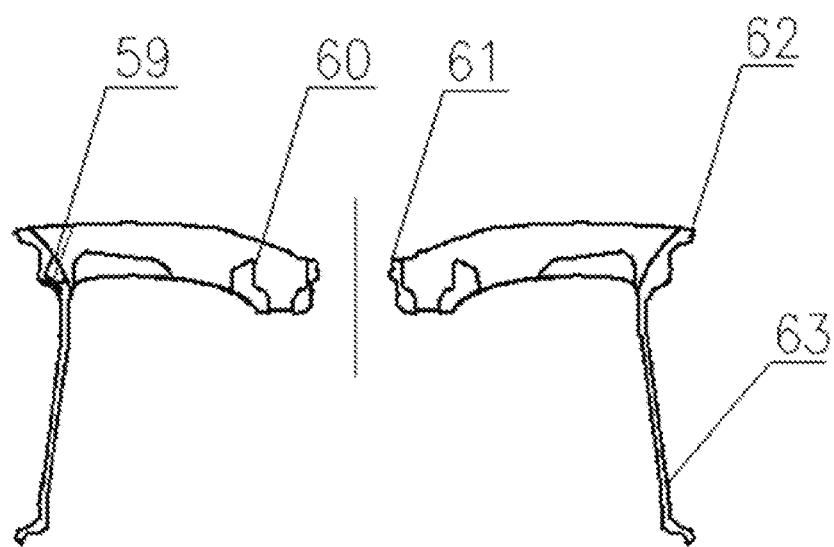
FIG. 5 is a schematic view of corner parts of a wheel.

1 rack
2 first jacking cylinder
3 first guide post
4 first lifting table
5 first guide rail
6 first adjusting cylinder
7 first sliding table
8 first polishing motor
9 outer rim polishing head
10 second jacking cylinder
11 second guide post
12 second lifting table
13 second guide rail
14 second adjusting cylinder
15 second sliding table
16 second polishing motor
17 cap section polishing head
18 station switching motor
19 coupling
20 bearing seat
21 bearing
22 station switching table
23 positioning guide rail
24 fifth sliding table
25 sixth sliding table
26 gear rack
27 clamping cylinder
28 drive motor
29 clamping wheel
30 polishing roller bed
31 wheel feeding roller bed
32 wheel discharge roller bed
33 pitch adjusting guide rail
34 pitch adjusting sliding table
35 pitch adjusting cylinder
36 third guide rail
37 third adjusting cylinder
38 third sliding table
39 connecting rod
40 turning plate
41 feeding guide rail
42 feeding sliding table
43 feeding cylinder
44 third polishing motor
45 valve hole polishing head
46 vision sensor
47 servo motor
48 shaft
49 rotating table
50 electric cylinder
51 support frame
52 third guide post
53 feeding platform
54 fourth guide rail
55 fourth sliding table
56 fourth adjusting cylinder
57 fourth polishing motor
58 bolt hole polishing head
59 valve hole part
60 bolt hole part
61 cap section part
62 outer rim part
63 wheel

DETAILED DESCRIPTION

Details and working conditions of a specific device provided by the disclosure will be given below in combination with the accompanying drawings.

A wheel corner polishing device is composed of a rack 1, a first jacking cylinder 2, first guide posts 3, a first lifting table 4, a first guide rail 5, a first adjusting cylinder 6, a first sliding table 7, a first polishing motor 8, an outer rim polishing head 9, a second jacking cylinder 10, second guide posts 11, a second lifting table 12, a second guide rail 13, a second adjusting cylinder 14, a second sliding table 15, a second polishing motor 16, a cap section polishing head 17, a station switching motor 18, a coupling 19, a bearing seat 20, a bearing 21, a station switching table 22, positioning guide rails 23, a fifth sliding table 24, a sixth sliding table 25, a gear rack 26, a clamping cylinder 27, drive motors 28, clamping wheels 29, a polishing roller bed 30, a wheel feeding roller bed 31, a wheel discharge roller bed 32, a pitch adjusting guide rail 33, a pitch adjusting sliding table 34, a pitch adjusting cylinder 35, a third guide rail 36, a third adjusting cylinder 37, a third sliding table 38, a connecting rod 39, a turning plate 40, a feeding guide rail 41, a feeding sliding table 42, a feeding cylinder 43, a third polishing motor 44, a valve hole polishing head 45, a vision sensor 46, a servo motor 47, a shaft 48, a rotating table 49, an electric cylinder 50, a support frame 51, third guide posts 52, a feeding platform 53, a fourth guide rail 54, a fourth sliding table 55, a fourth adjusting cylinder 56, a fourth polishing motor 57 and a bolt hole polishing head 58.

The wheel corner polishing device includes a station switching system, in which the station switching motor 18 is fixed on the rack 1, the output end of the station switching motor 18 is connected with the station switching table 22 via the coupling 19, and the polishing roller bed 30 and four positioning guide rails 23 are mounted on the upper surface of the station switching table 22. The fifth sliding table 24 and the sixth sliding table 25 are symmetrically mounted on the positioning guide rails 23, and are connected via the gear rack 26. The clamping cylinder 27 is fixed on the station switching table 22, and the output end of the clamping cylinder 27 is connected with the fifth sliding table 24. Two drive motors 28 are respectively mounted on the fifth sliding table 24 and the sixth sliding table 25, and the clamping wheels 29 are mounted at the output ends of the drive motors 28. When a wheel enters the polishing roller bed 30 from the wheel feeding roller bed 31, the clamping cylinder 27 is started, the fifth sliding table 24 and the sixth sliding table 25 move synchronously under the action of the gear rack 26, and the wheel can be positioned and clamped via the clamping wheels 29. In an upper station, the wheel is positioned and clamped on the upper surface of the station switching table 22, and then corners of bolt holes and a valve hole are polished. The structure of the lower surface of the station switching table 22 is symmetric to and completely consistent with that of the upper surface; and in a lower station, the wheel is positioned and clamped on the lower surface of the station switching table 22, and then corners of the outer rim and cap sections are polished. The station switching motor 18 can control rotation of the station switching table 22, thus controlling cyclic switching of the upper station and the lower station; after corner polishing of the bolt holes and valve hole of the wheel are completed at the upper station, it is switched to the lower station for corner polishing of the outer rim and cap sections; and after the polishing is completed, the wheel is rotated to the upper station again for transferring down. Corner polishing of the bolt holes and valve hole of the wheel is completed at the upper station, corner polishing of the outer rim and cap sections is completed at the lower station, corner polishing of four positions is completed via switching and coordination of the upper and lower stations.

The wheel corner polishing device includes a valve hole polishing system, in which the pitch adjusting cylinder 35 and the pitch adjusting guide rail 33 are fixed on the rack 1, the pitch adjusting sliding table 34 is mounted on the pitch adjusting guide rail 33, and the output end of the pitch adjusting cylinder 35 is connected with the pitch adjusting sliding table 34 to control horizontal movement of the sliding table. The third adjusting cylinder 37 and the third guide rail 36 are fixed on the pitch adjusting sliding table 34, the third sliding table 38 is mounted on the third guide rail 36, and the output end of the third adjusting cylinder 37 is connected with the third sliding table 38 to control horizontal movement of the third sliding table 38. The turning plate 40 is articulated with the pitch adjusting sliding table 34, one end of the connecting rod 39 is articulated with the third sliding table 38, the other end of the connecting rod 39 is articulated with the turning plate 40, and when the third adjusting cylinder 37 drives the third sliding table 38 to move horizontally, the turning angle of the turning plate 40 can be adjusted. The feeding cylinder 43 and the feeding guide rail 41 are fixedly mounted on the turning plate 40, the feeding sliding table 42 is mounted on the feeding guide rail 41, the output end of the feeding cylinder 43 is connected with the feeding sliding table 42, the third polishing motor 44 is fixed on the feeding sliding table 42, and the valve hole polishing head 45 is mounted at the output end of the third polishing motor 44. The vision sensor 46 is mounted at the bottom of the turning plate 40 and used for recognizing the position of the valve hole, after the wheel is positioned and clamped at the upper station, the drive motors 28 are started, the wheel rotates at a low speed, the valve hole rotating below the vision sensor 46 is recognized, at the moment, the wheel stops rotating, and the valve hole is ready for corner polishing. The horizontal position of the valve hole polishing head 45 can be adjusted via the pitch adjusting cylinder 35, the angle between the valve hole polishing head 45 and the central axis of the wheel can be adjusted via the third adjusting cylinder 37, the rotating polishing head can be fed for polishing in the direction of the valve hole via the feeding cylinder 43. The polishing head of this system can be correspondingly adjusted according to the radial position and angle of the valve hole, and can thus be used for corner polishing of different wheel outer diameters and different valve hole angles with wider adaptability.

The wheel corner polishing device includes a bolt hole polishing system, in which the servo motor 47 is fixedly mounted at the top of the rack 1, and the output end of the servo motor 47 is connected with the rotating table 49 via the shaft 48 to control rotation of the rotating table 49. The support frame 51 is fixed on the rotating table 49, the electric cylinder 50 is fixed on the support frame 51, and the output end of the electric cylinder 50 is connected with the feeding platform 53 to control up-down motion of the feeding platform 53 under the guiding effect of the third guide posts 52. The fourth guide rail 54 and the fourth adjusting cylinder 56 are fixed on the feeding platform 53, the fourth sliding table 55 is mounted on the fourth guide rail 54, and the output end of the fourth adjusting cylinder 56 is connected with the fourth sliding table 55 to control horizontal motion thereof. The fourth polishing motor 57 is mounted on the fourth sliding table 55, and the bolt hole polishing head 58 is mounted at the output end of the fourth polishing motor 57. After the valve hole of the wheel is recognized by the vision sensor 46, the wheel stops rotating, the first polished bolt hole is determined according to the included angle between the valve hole and the bolt hole, at the moment, the servo motor 47 is started to drive the rotating table 49 to rotate, the bolt hole polishing head 58 is thus driven to rotate around the center of the wheel, the bolt hole polishing head 58 rotates to a position above the first bolt hole that needs to be polished, and then the electric cylinder 50 is started to drive the rotating bolt hole polishing head 58 to be fed down to polish the corner. After the corner of the first bolt hole is polished, the electric cylinder 50 drives the bolt hole polishing head 58 to move up and reset, then the servo motor 47 continuously drives the bolt hole polishing head 58 to rotate around the center of the wheel, the bolt hole polishing head 58 rotates to a position above the second bolt hole according to the included angle between the bolt holes, the polishing begins, all bolt holes are polished in sequence. The horizontal position of the polishing head can be adjusted via the fourth adjusting cylinder 56, thus, this system can polish wheel bolt holes having different pitch diameters, the servo motor 47 can drive the polishing head to rotate 360 degrees around the center of the wheel, thus, this system can be used for polishing wheels having different numbers of bolt holes.

The wheel corner polishing device includes a rim and cap section synchronous polishing system, in which the first jacking cylinder 2 is fixed on a cross beam at the bottom of the rack 1, and the output end of the first jacking cylinder 2 is connected with the first lifting table 4 to control ascending and descending of the first lifting table 4 under the guiding effect of the four first guide posts 3. The first adjusting cylinder 6 and the first guide rail 5 are fixed on the first lifting table 4, the first sliding table 7 is mounted on the first guide rail 5, the output end of the first adjusting cylinder 6 is connected with the first sliding table 7 to control horizontal motion thereof, the first polishing motor 8 is mounted on the first sliding table 7, the outer rim polishing head 9 is mounted at the output end of the first polishing motor 8, and feeding of the outer rim polishing head 9 can be controlled via the first jacking cylinder 2. The second jacking cylinder 10 is fixed on the cross beam at the bottom of the rack 1, and the output end of the second jacking cylinder 10 is connected with the second lifting table 12 to control ascending and descending of the second lifting table 12 under the guiding effect of the four second guide posts 11. The second adjusting cylinder 14 and the second guide rail 13 are fixed on the second lifting table 12, the second sliding table 15 is mounted on the second guide rail 13, the output end of the second adjusting cylinder 14 is connected with the second sliding table 15 to control horizontal motion thereof, the second polishing motor 16 is mounted on the second sliding table 15, the cap section polishing head 17 is mounted at the output end of the second polishing motor 16, and feeding of the cap section polishing head 17 can be controlled via the second jacking cylinder 10. After the valve hole and bolt holes of the wheel are polished at the upper station, the wheel is switched to the lower station via the station switching system, at the moment, the wheel begins rotating at a low speed under drive of the drive motors 28, the first jacking cylinder 2 drives the outer rim polishing head 9 to be fed to polish the outer rim of the wheel, and the second jacking cylinder 10 drives the cap section polishing head 17 to be fed to polish the cap sections of the wheel. From the beginning of polishing to one-circle rotation of the wheel, the whole outer rim and the cap sections are completely polished. The horizontal position of the outer rim polishing head 9 can be adjusted via the first adjusting cylinder 6, and the horizontal position of the cap section polishing head 17 can be adjusted via the second adjusting cylinder 14, so this system can polish wheels having different outer diameters and different cap section sizes.

The working process of the device is: first, according to the outer diameter, cap section size, valve hole angle and bolt hole pitch diameter of a wheel produced on line, the initial positions of the outer rim polishing head 9, the cap section polishing head 17, the valve hole polishing head 45 and the bolt hole polishing head 58 are adjusted. When the wheel enters the polishing roller bed 30 from the wheel feeding roller bed 31, the clamping cylinder 27 is started, and the wheel is positioned and clamped; next, the drive motors 28 are started to drive the wheel to rotate at a low speed, and when the vision sensor 46 recognizes the position of the valve hole, the wheel stops rotating; then, the valve hole polishing head 45 is fed to polish the corner of the valve hole, the bolt hole polishing head 58 rotates to a position above the first bolt hole and polishes the corner of the bolt hole, after the first bolt hole is polished, the servo motor 47 drives the rotating table 49 to rotate, the bolt hole polishing head 58 rotates to a position above the second bolt hole, and the corners of the bolt holes are polished in sequence, till all the bolt holes are polished; next, the station switching motor 18 is started, the wheel at the upper station rotates to the lower station and continuously undergoes corner polishing of the outer rim and cap sections, and the positioning device idle at the lower station rotates to the upper station for positioning and polishing of next wheel. At the moment, the device is in a full-load state, the corners of the valve hole and bolt holes of the wheel are polished at the upper station, the corners of the outer rim and cap sections are polished at the lower station, and all the corner polishing time is effectively shortened via reasonable design of the upper and lower stations, so the cycle is short and the efficiency is high. When both the upper and lower stations complete polishing, the station switching motor 18 is restarted to switch the wheel at the upper or lower station, at the moment, corner polishing at four positions has been completed for the wheel at the upper station, the wheel is loosened and fed into the wheel discharge roller bed 32, the upper station continuously receives next wheel to be polished, and so on.

The disclosure can meet the requirement of an automatic production line, and can automatically polish four positions including bolt hole corners, a valve hole corner, outer rim corners and cap section corners of a wheel via reasonable process layout, upper and lower stations and coordination of the systems, so that the minimum fillets of the four positions meet the requirements. The device has the characteristics of short cycle, high efficiency, skilful design, strong generality, easy manufacture and the like.

The invention claimed is:

1. A wheel corner polishing device, being composed of a rack, a first jacking cylinder, four first guide posts, a first lifting table, a first guide rail, a first adjusting cylinder, a first sliding table, a first polishing motor, an outer rim polishing head, a second jacking cylinder, four second guide posts, a second lifting table, a second guide rail, a second adjusting cylinder, a second sliding table, a second polishing motor, a cap section polishing head, a station switching motor, a coupling, a bearing seat, a bearing, a station switching table, four positioning guide rails, a fifth sliding table, a sixth sliding table, a gear rack, a clamping cylinder, two drive motors, clamping wheels, a polishing roller bed, a wheel feeding roller bed, a wheel discharge roller bed, a pitch adjusting guide rail, a pitch adjusting sliding table, a pitch adjusting cylinder, a third guide rail, a third adjusting cylinder, a third sliding table, a connecting rod, a turning plate, a feeding guide rail, a feeding sliding table, a feeding cylinder, a third polishing motor, a valve hole polishing head, a vision sensor, a servo motor, a shaft, a rotating table, an electric cylinder, a support frame, third guide posts, a feeding platform, a fourth guide rail, a fourth sliding table, an fourth adjusting cylinder, a fourth polishing motor and a bolt hole polishing head, wherein the station switching motor is fixed on the rack, an output end of the station switching motor being connected with the station switching table via the coupling, and the polishing roller bed and the four positioning guide rails being mounted on an upper surface of the station switching table; the fifth sliding table and the sixth sliding table being symmetrically mounted on the four positioning guide rails, and being connected via the gear rack; the clamping cylinder being fixed on the station switching table, and an output end of the clamping cylinder being connected with the fifth sliding table; two drive motors being respectively mounted on the fifth sliding table and the sixth sliding table, and the clamping wheels being mounted at output ends of the two drive motors; in an upper station, a wheel is positioned and clamped on the upper surface of the station switching table, and then corners of bolt holes and a valve hole being polished; in a lower station, the wheel being positioned and clamped on a lower surface of the station switching table, and then corners of an outer rim and cap sections being polished; corner polishing of four positions being completed via switching and coordination of the upper station and the lower station;

the pitch adjusting cylinder and the pitch adjusting guide rail being fixed on the rack, the pitch adjusting sliding table being mounted on the pitch adjusting guide rail, and an output end of the pitch adjusting cylinder being connected with the pitch adjusting sliding table to control horizontal movement of the pitch adjusting sliding table; the third adjusting cylinder and the third guide rail being fixed on the pitch adjusting sliding table, the third sliding table being mounted on the third guide rail, and an output end of the third adjusting cylinder being connected with the third sliding table to control horizontal movement of the third sliding table; the turning plate being articulated with the pitch adjusting sliding table, one end of the connecting rod being articulated with the third sliding table, a second end of the connecting rod being articulated with the turning plate, and when the third adjusting cylinder drives the third sliding table to move horizontally, a turning angle of the turning plate being adjusted; the feeding cylinder and the feeding guide rail being fixedly mounted on the turning plate, the feeding sliding table being mounted on the feeding guide rail, an output end of the feeding cylinder being connected with the feeding sliding table, the third polishing motor being fixed on the feeding sliding table, and the valve hole polishing head being mounted at an output end of the third polishing motor; the vision sensor being mounted at a bottom of the turning plate;

the servo motor being fixedly mounted at a top of the rack, and an output end of the servo motor being connected with the rotating table via the shaft to control rotation of the rotating table; the support frame being fixed on the rotating table, the electric cylinder being fixed on the support frame, and an output end of the electric cylinder being connected with the feeding platform to control up-down motion of the feeding platform under a guiding effect of the third guide posts; the fourth guide rail and the fourth adjusting cylinder being fixed on the feeding platform, the fourth sliding table being mounted on the fourth guide rail, and an output end of the fourth adjusting cylinder being connected with the fourth sliding table to control horizontal motion thereof; the fourth polishing motor being mounted on the fourth sliding table, and the bolt hole polishing head being mounted at an output end of the fourth polishing motor; after the valve hole of the wheel is recognized by the vision sensor, the wheel stopping rotating, a first polished bolt hole being determined according to an included angle between the valve hole and a first bolt hole of the bolt holes corresponding to the first polished bolt hole, at the moment, the servo motor being started to drive the rotating table to rotate, the bolt hole polishing head is thus driven to rotate around a center of the wheel, the bolt hole polishing head rotating to a position above the first bolt hole that needs to be polished, and then the electric cylinder being started to drive the rotating bolt hole polishing head to be fed down to polish a corner of the first bolt hole; after the corner of the first bolt hole is polished, the electric cylinder driving the bolt hole polishing head to move up and reset, then the servo motor continuously driving the bolt hole polishing head to rotate around the center of the wheel, the bolt hole polishing head rotating to a position above a second bolt hole of the bolt holes according to an included angle between the bolt holes, the polishing beginning, all bolt holes being polished in sequence;

the first jacking cylinder being fixed on a cross beam at a bottom of the rack, and an output end of the first jacking cylinder being connected with the first lifting table to control ascending and descending of the first lifting table under a guiding effect of the four first guide posts; the first adjusting cylinder and the first guide rail being fixed on the first lifting table, the first sliding table being mounted on the first guide rail, an output end of the first adjusting cylinder being connected with the first sliding table to control horizontal motion thereof, the first polishing motor being mounted on the first sliding table, the outer rim polishing head being mounted at an output end of the first polishing motor, and feeding of the outer rim polishing head being controlled via the first jacking cylinder; the second jacking cylinder being fixed on the cross beam at the bottom of the rack, and an output end of the second jacking cylinder being connected with the second lifting table to control ascending and descending of the second lifting table under a guiding effect of the four second guide posts; the second adjusting cylinder and the second guide rail being fixed on the second lifting table, the second sliding table being mounted on the second guide rail, an output end of the second adjusting cylinder being connected with the second sliding table to control horizontal motion thereof, the second polishing motor being mounted on the second sliding table, the cap section polishing head being mounted at an output end of the second polishing motor, and feeding of the cap section polishing head being controlled via the second jacking cylinder; after the valve hole and the bolt holes of the wheel are polished at the upper station, the wheel being switched to the lower station via a station switching system, at the moment, the wheel beginning rotating at a low speed under drive of the two drive motors, the first jacking cylinder driving the outer rim polishing head to be fed to polish the outer rim of the wheel, and the second jacking cylinder driving the cap section polishing head to be fed to polish the cap sections of the wheel; and from the beginning of polishing to one-circle rotation of the wheel, the whole outer rim and the cap sections being completely polished.

* * * * *